Patented Jan. 8, 1929.

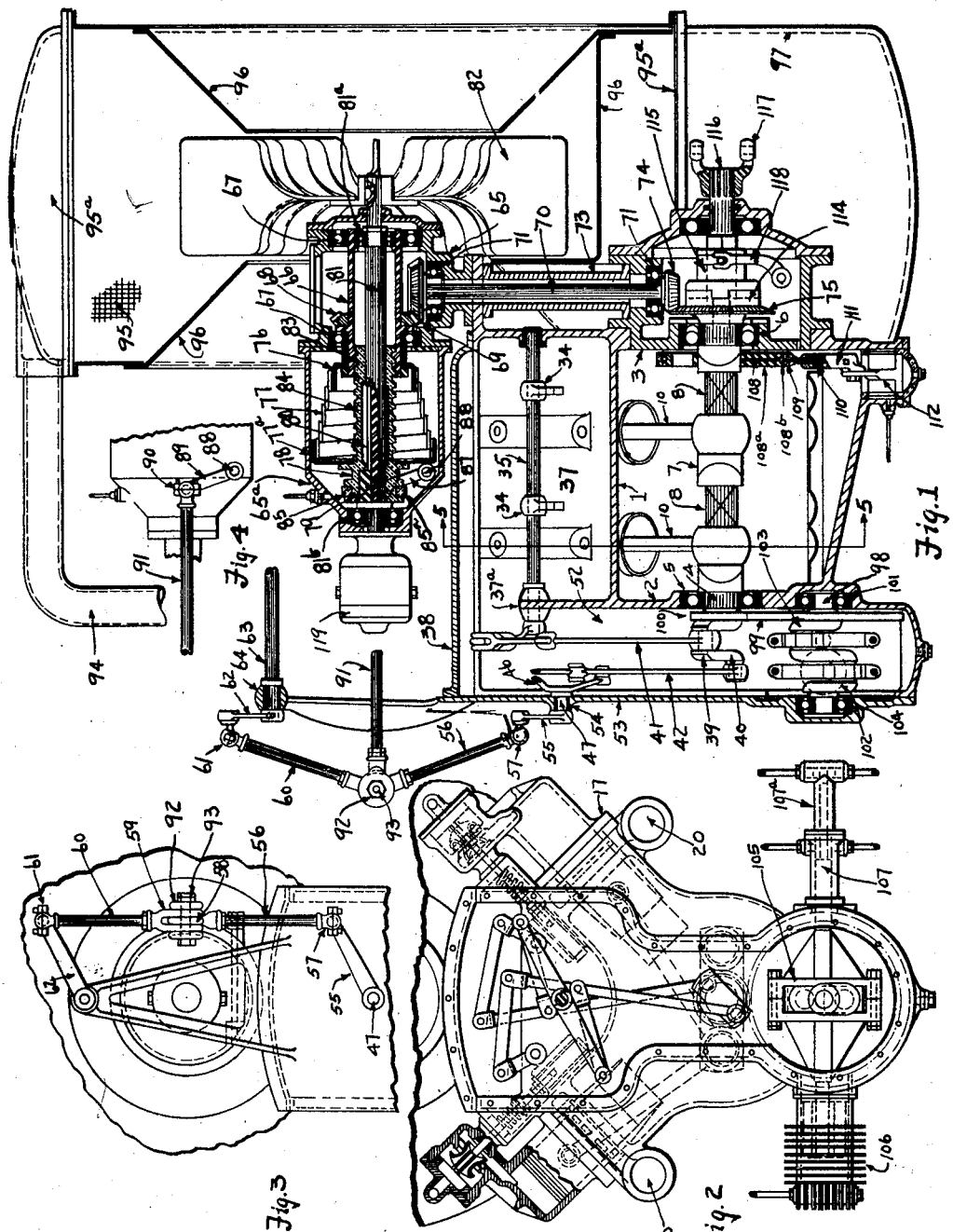

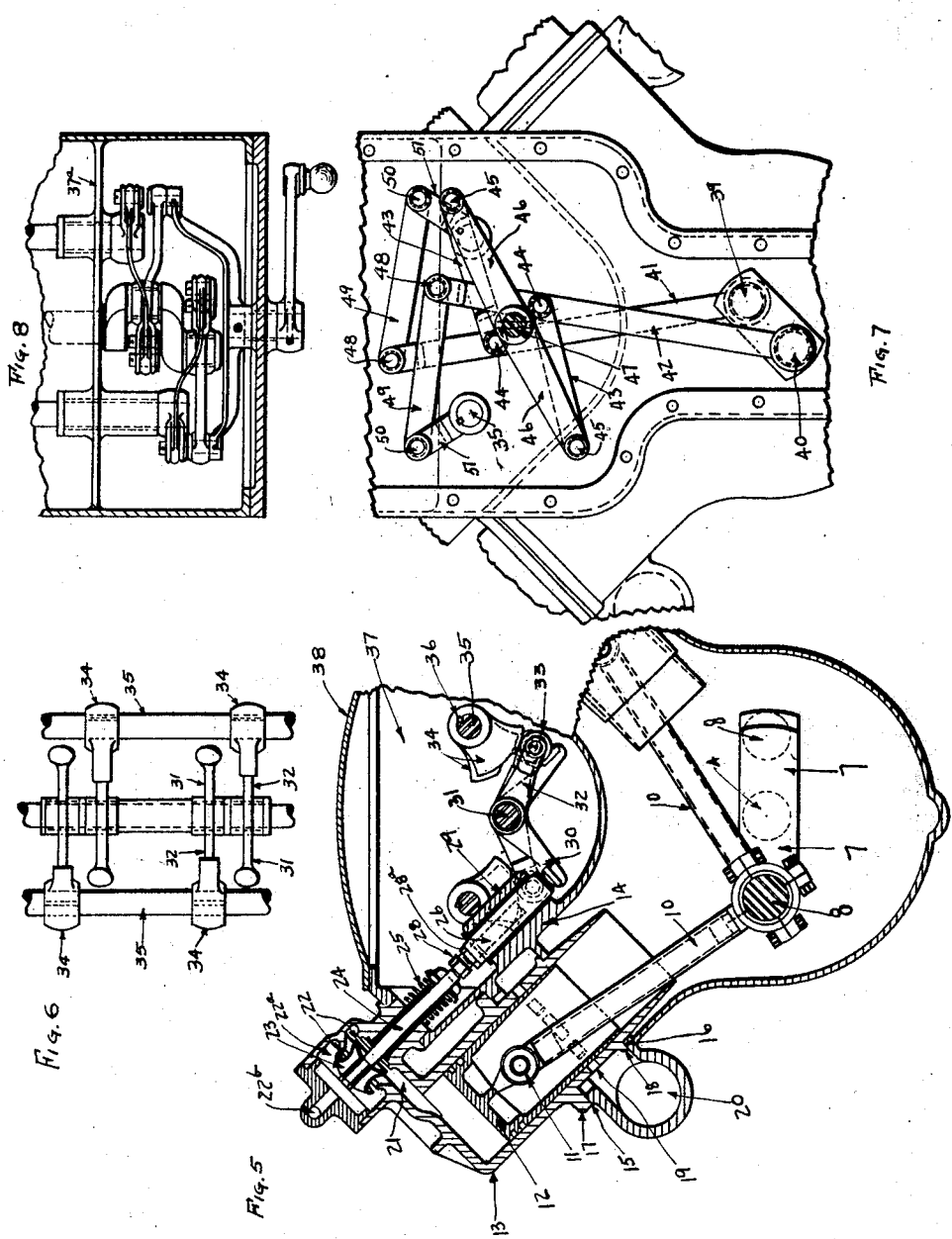

1,698,317

UNITED STATES PATENT OFFICE.

ROBERT F. METCALFE, OF ERIE, PENNSYLVANIA, ASSIGNOR TO SKINNER PATENT HOLDING COMPANY, OF ERIE, PENNSYLVANIA, A CORPORATION OF PENNSYLVANIA.

STEAM ENGINE.

Application filed October 27, 1919. Serial No. 333,795.

The engine is particularly designed for automotive purposes. Here very high power with light weight is desirable and also a powerful engine which may be coupled up in a close space. I prefer to utilize the engine of what is known as the una-flow type and to make the cylinders for the engine single-acting so that a packing of joints, etc., may be very largely avoided. I prefer also to arrange the cylinders at an angle to each other and to utilize the space in the angle for mounting the valve gear. This arrangement simplifies the valve gear and also simplifies the construction. The chamber provided in the angle between the cylinders provides a very simple means for submerging the valve gear in oil.

I prefer also to provide a valve gear with an automatic means for shifting the cut-off with the initial starting of the vehicle. It is desirable, in fact, with a una-flow engine quite essential, that there be a late cut-off with the starting of the engine because such engines having a uniform compression require a practically full pressure effort to overcome this compression. As the engine speeds up, on the contrary, it is desirable that the cut-off be shortened and this should preferably be accomplished automatically so that the attention of an operator is not required to accomplish this feature of control in starting. The ordinary throttle (not shown) may be provided for the engine and this may be so coupled with the cut-off mechanism as to compel the use of the cut-off mechanism in the normal running of the engine as distinguished from the throttle. This will add to the efficiency and, of course, will necessitate a cut-off which will give the greatest economy for the speed desired under the conditions of load. There are numerous other details of my invention which will be disclosed in the following description and claims.

The invention is illustrated in the accompanying drawings as follows:—

Fig. 1 shows a central vertical section of the engine.

Fig. 2 an end elevation, the cover plate to the link chamber being removed.

Fig. 3 an end view of a portion of the engine showing a part of the automatic controlling device.

Fig. 4 a side elevation of a portion of the automatic shifting device.

Fig. 5 a section on the line 5—5 in Fig. 1.

Fig. 6 a plan view of a part of the valve gear.

Fig. 7 an end elevation of the link motion of the valve gear.

Fig. 8 a plan view of the same mechanism.

1 marks the crank case, this with its extensions forming the frame for the engine. It is preferably cylindrical with a closed end 2, the opposite end having the cover plate 3. A crank shaft 4 is journaled in a bearing 5 in the closed end 2 and a bearing 6 in the closure plate 3. Cranks 7 are directly opposed and have the crank pins 8. Connecting rods 10 of two cylinders operate on each crank. The connecting rods extend to the pins 11 which are carried by the pistons 12. The pistons operate in the cylinders 13. The cylinders are mounted on extensions 14 from the crank case. These extensions 14 have the seats 15 and 16 on which the flanges 17 and 18 of the cylinder rest. The flange 17 is clamped to its seat, the joint between the seats 16 and 18 ordinarily having a yielding gasket (not shown) so that the load is carried by the flange 17 and its seat. Ports 19 extend through the cylinder walls to an annular manifold opening 20 which are connected with the exhaust pipe 94.

It will be noted that by reason of the fact that the cylinder has a portion below the ports 19 below the point of load strain indicated by the flange 17 the lower part of the cylinder may be made quite light. Further the distortion due to variations in heat are thus largely obviated. The construction also facilitates the manufacture of the device.

The steam ports 21 extend by way of the valve passages 22 to the chest 22$^a$. Steam is supplied to the steam chest through a pipe 22$^b$. The valve 23 is of the double-heat poppet valve type. The valve is carried by a stem 24. A spring 25 operating on the stem tends to seat the valve. The valve is operated from a push pin 26 and the seating of the valve is adjusted by the nut 28 in the usual manner. The push pin 26 operates in a bearing 29 in the frame and is operated by a rock lever 30. The rock lever is journaled on a rod 31 and is provided with an opposing rock arm 32. The rock arm 32 carries a cam roller 33 which is engaged by the cam surface of the cam 34. The cam 34 is carried by a rock shaft 35 being keyed thereon by a key 36.

It will be understood that there are four of the valves similar to the one described and clearly shown in Fig. 5, one for each cylinder, and that there are four of the rock arms 30 and that two of the rock arms 30 are directed to one side of the engine and two to the opposite side and that there are two of the rock shafts 35, each carrying two cams 34. The cams with their operating mechanism are, of course, so disposed as to properly time the valves. The pistons in the cylinders on the same side alternate and the cylinders on the same crank shaft alternate. It will be noted that the valve gear is mounted in a chamber 37 which is formed by the trough formed by the angular disposition of the cylinder extensions 14 of the crank case and this chamber is closed by a cover 38 and the extensions. Oil is maintained in the chamber 37 at a level to submerge the valve gear. A dam 37$^a$ is arranged at the end of the chamber over which the oil flows to the link chamber hereinafter described. The valves are operated through cranks 39 and 40 extending from the end of the crank shaft 4. Rods 41 and 42 are operated by the cranks 39 and 40 respectively. These rods are fulcrumed on pins 44 carried by fulcrum links 43. The fulcrum links 43 are mounted on pins 45 carried by the shift lever 46. The shift lever is mounted on a shaft 47. The upper ends of the rods 41 and 42 are provided with pins 48 by means of which the links 49 are connected with said rods. The links 49 are connected by means of pins 50 with the rock arms 51. The rock arms 51 are keyed on the shaft 35.

It will be noted that as the cranks 39 and 40 are rotated the rods 41 and 42 are rocked on the fulcrums 44, thus giving to the rock arms 51 an oscillating motion and to the valves their travel through the gear heretofore described. It will also be noted that as the rods are moved vertically the fulcrum rods 43 are moved about the pins 45 and this gives to the pins or fulcrum points 44 a curved path about the pin 45 as a center. This curved path gives to the upper end of the rod a cross movement which is communicated through the link 49 to the rock lever. This curved path of the fulcrum rod 43 is utilized in this valve gear for varying the throw of the valve and for reversing the mechanism. As the shift lever 46 is swung so as to bring the fulcrum rods more nearly horizontal the throw or curve of the fulcrum rods relatively to the movement of the link 49 is decreased because the radial line represented by the rod 43 extending from its pivot is more nearly at right angles to the direction of movement of the rods 41 and 42. If the movement of the shift lever 46 is continued so as to reverse the position of the pivots or pins 46 then the curved path which will be given to the pin 44 accomplishes a reverse movement of the upper end of the rods 41 and 42 and consequently reverses the action of the valve. This can be readily followed. Taking the lefthand connection if the lever 46 is moved upwardly so as to bring the pin 45 above the shaft 47 it will be seen that a downward movement of the rod 42 will swing the upper end of that rod toward the left whereas a downward movement of the rod 42 with the parts positioned as they are in the drawings will effect a movement of the upper end of the rod 42 to the right.

The link mechanism is contained in a chamber 52 at the end of the crank case and this chamber is enclosed or covered by a plate 53, the removal of the plate exposing the entire linkage. The chamber 52 is in communication with the chamber 37 and as the oil overflows from the chamber 37 it is carried into the chamber 52 and from this chamber it is carried through the bearings between the chamber 52 in the crank case to the crank case from which the circulation starts.

The shaft 47 is carried in a bearing 54. A lever 55 is fixed on the shaft and this is connected by a ball joint 57 with a link 56. The link 56 terminates at its upper end in a disc 58 which operates within a fork 59 arranged on a link 60. The link 60 is connected by a ball joint 61 with a rock arm 62. The rock arm is carried by a manually controlling shaft 63, the controlling shaft being mounted in a bearing 64 on the engine frame. It will be readily seen that as the rock arm 62 is moved the rock arm 55 is moved so long as the links 60 and 56 are maintained in a given relation. These links may be rigidly connected together but I prefer to joint them as shown and to utilize this joint for interposing an automatic shifting device for automatically throwing the link mechanism from a late cut-off to an early cut-off as the engine is started. This automatic shifting mechanism may be accomplished with various mechanisms utilizing speed as a factor of control but I prefer the one shown. The automatic device is mounted in a frame 65 carried on the engine frame. A main shaft 66 is journaled in the frame 65 by means of bearings 67. This shaft is hollow. The shaft is provided with a bevelled gear 68 which meshes with a bevelled gear 69. The beveled gear 69 is mounted on a vertical shaft 70. The vertical shaft 70 is mounted in bearings 71 and enclosed by a tube 73. The bevelled gear 74 is fixed on the lower end of the shaft and meshes with a bevelled gear 75. The beveled gear 75 is fixed on the crank shaft so that the shaft 66 is rotated at a speed varying as the crank shaft speed varies. A driver 76 is fixed on the shaft 66 and drives a spring 77. The opposite end of the spring is connected with a mounting 77$^a$ which is carried by a sliding head 78. The sliding head is provided with a spline 79 which operates in a groove 80 in a shaft 81. The shaft 81 is carried by a bearing 81$^a$ in the shaft 66 and a bearing 81$^b$ arranged in the extension 65$^a$ on the frame. A fan 82 is fixed on the outer end of the shaft 81. A nut 83 is arranged on the inner surface of the shaft 66. It operates on a screw 84 extending from the head 78.

It will readily be seen that as the shaft 66 is driven from the engine the motion of the shaft 66 is communicated to the fan 82 through the spring 77. This spring should be wound up or have initial tension. When the resistance of the fan becomes sufficiently great due to its speed to overcome the initial tension of the spring the shaft 66 will rotate or turn relatively to the head 78 and screw 84. As a result the nut 83 will run up on the screw 84 and the head 78 will be moved axially along the shaft 81. As soon as this movement has progressed a sufficient distance to give to the spring an added tension or strength sufficient to balance the resistance effected by the fan at the then speed the shaft 81 will rotate in unison with the shaft 66 and this condition will continue until a change in speed takes place when there will be a further relative movement and screw action with a further axial movement of the head. In the ordinary operation of the engine this will be progressive. As the engine picks up and reaches a speed which overcomes the initial tension and continues to speed up the head will be moved as the speed picks up along the shaft 81 until the spring is completely wound up and housed in the driver 77$^a$. I prefer to have the mounting 77$^a$ so arranged as to move under the action of the screw directly against the driver 76 when the ultimate speed is reached and consequently the spring is relieved of any added tension due to any higher speed.

The head 78 is provided with a grooved shoulder 85 on which is mounted a ring 85$^a$. A lever 87 is pivotally connected with the ring 85$^a$ in the usual manner by a forked end. The arm 87 is fixed on a shaft 88. A rock arm 89 is fixed on the outer end of the shaft 88 and is connected by a ball joint 90 with a link 91. The link 91 has a forked end 92 which overlaps the forks 59 on the link 60. A pin 93 extends through the forks 92, 59 and disc 58, thus completing the pivotal connection between the links 56, 60 and 91. The link 91 controls the position of the pivot so far as longitudinal movement is concerned and the broad faces of the joint preventing a bending of the link in a transverse direction.

With the links 56 and 60 deflected as shown in Fig. 1 the shift lever 46 is so thrown as to give a late cut-off. As the engine picks up and the automatic shift device straightens the links 56 and 60 the lever 46 is swung to give a short cut-off. The speed at which this is accomplished may be regulated by the relative strength of the spring 77 and the size or resistance of the fan. After the links have been straightened through the shift device just described and the engine has reached what may be conveniently termed the "minimum predetermined speed" the valves may be controlled so as to give any cut-off desired through the operation of the control shaft 63, the movement of which is communicated directly through the links 56 and 60 operating as one to the shift lever 46. An exhaust connection 94 extends from the exhaust manifold opening 20 to a condenser 95. Deflectors 96 are provided with relation to the fan so that the air is drawn to the fan and delivered from the fan through the condenser. Ordinarily the condenser is arranged at each side of the fan and the upper and lower parts of the condenser are closed by covers 95$^a$ so that air is delivered from the center of the fan upwardly and downwardly and then laterally through the condenser. Water is delivered from the condenser to the water supply tank 97 which is arranged at the end of the crank case and at each side of the driven shaft.

I prefer to drive the air, oil and water pumps from mechanism arranged in the link chamber 52. The pump shaft 98 is driven through a gear 99 which meshes with a gear 100 on the crank shaft 4. The shaft 98 is carried in bearings 101 in the crank case and 102 in the cover 53. Cranks 103 and 104 are arranged in the shaft 98 and these drive the Scotch yokes 105, the pistons of the air pump 106, water pump 107 and oil pump 107$^a$ being operated from these yokes.

A passage 108 is arranged in an eccentric 108$^a$ and communicates with an annular passage 108$^b$ on the face of the eccentric. An eccentric strap 109 has a passage leading to the annular passage 108$^b$ through a plunger 110. The plunger 110 operates in an oscillating cylinder 111, the cylinder having an intake in a well 112 connected with an oil supply.

The clutch member 114 is fixed on the end of the crank shaft and is adapted to operate with the clutch member 115 on the floating shaft 116 which is provided with the usual transmission devices 117. The clutch may be shifted by means of the lever 118. This is desirable when it is desired to use the engine for power purposes other than in connection with a tractor. A generator 119 is mounted on the end of the extension 65a and is driven from the shaft 81. This makes a convenient mounting for a generator, particularly as the speed of the fan is such as usually desired for a generator.

What I claim as new is:—

1. In a steam engine, the combination of a crank case having cylinder projections arranged at an angle forming a valve gear chamber in the angle; cylinders on the projections; a valve gear in the angle; valves in the cylinders actuated by the valve gear, said chamber being adapted to contain oil at a level to submerge the gear; a link chamber at the end of the crank case and adjoining the chamber in the angle; and a link mechanism in the link chamber communicating motion to the valve gear, the chamber in the angle being arranged to overflow into the link chamber.

2. In a steam engine, the combination of a crank case having cylinder projections arranged at an angle to each other forming a valve gear chamber in the angle; cylinders on the projections; valves controlling the admission of steam to the cylinders; a crank shaft; a valve gear in the chamber controlling the valves; a link mechanism controlling the valve gear comprising rock arms connected with the valve gear and eccentric rods extending from the crank shaft; links extending transversely from said rods to said rock arms; fulcrum rods extending transversely from said eccentric rods; and a rocker controlling lever on the opposite sides of which said fulcrum rods are mounted.

3. In a steam engine, the combination of a crank case having cylinder projections arranged at an angle forming a valve gear chamber in the angle; cylinders on the projections; a crank; valves controlling the admission of steam to the cylinder; a valve gear in the valve gear chamber actuating said valves, said valve gear comprising a rock shaft at each side of the valve gear chamber; rocker actuating means on said rock shaft; rockers transmitting movement of each rocker actuating means at one side of the center of the angle to the valves on the opposite cylinders; a link mechanism actuating said shafts comprising rock arms on said rock shafts; eccentric rods extending from the crank shaft; links extending transversely from the rods to said rock arm; fulcrum rods extending transversely from said eccentric rods; and a rocking control lever on the opposite sides of which said fulcrum rods are mounted.

4. In a steam engine, the combination of a cylinder; a valve controlling the admission of steam to the cylinder; a crank shaft driven by the engine; a valve gear linkage driven from the crank shaft and actuating the valve comprising an eccentric rod actuated from the crank shaft; a link extending transversely from the eccentric rod, the movement of which is communicated to the valve; a fulcrum rod extending from the eccentric rod; means for moving the mounting for the fulcrum rod to vary the cut-off; and a controlling device for the gear acting on the mounting comprising an automatic member sensitive to the speed of the engine and shifting the mounting as the engine speeds up initially to change the stroke from a late cut-off to an early cut-off, said controlling device having means operating independently of said member and acting on the mounting to vary the cut-off.

5. In a steam engine, the combination of a variable cut-off valve gear; a controlling mechanism for said gear comprising a linkage having two links hinged intermediate their ends and adapted to swing only in one plane; means sensitive to speed operating upon said links at their pivotal connection for changing the pivotal relation between said links to communicate movement to the valve gear; and devices operating directly through said links for shifting the valve gear independently of said means.

6. In a steam engine, the combination of a variable cut-off valve gear; a controlling mechanism for said gear comprising a speed sensitive element in which a fan through its resistance forms one of the opposing forces and the spring driving the fan the other force, said element automatically shifting the cut-off to shorten the same as the engine speeds up; and means acting independently of said element to shift the cut-off in the normal running of the engine.

7. In a steam engine, the combination of a variable cut-off valve gear; a controlling mechanism for said gear comprising a speed sensitive element in which a fan through its resistance forms one of the opposing forces and a spring driving the fan the other force; and a condenser to which the fan delivers its air.

8. In a steam engine, the combination of a variable cut-off valve gear; a controlling mechanism for said gear comprising a speed sensitive element in which a fan through its resistance forms one of the opposing forces and the spring driving the fan the other force, said element automatically shifting the cut-off to shorten the same as the engine speeds up; means relieving the spring of the load after the speed reaches a pre-determined minimum; and a condenser to which air is delivered by the fan.

In testimony whereof I have hereunto set my hand.

ROBERT F. METCALFE.